United States Patent
Ishibashi et al.

(10) Patent No.: US 9,705,361 B2
(45) Date of Patent: Jul. 11, 2017

(54) POWER SUPPLY DEVICE AND METHOD OF CONTROLLING POWER SUPPLY

(75) Inventors: Yoshihito Ishibashi, Tokyo (JP); Hiroaki Kitano, Saitama (JP); Shigeru Tajima, Kanagawa (JP); Tetsu Natsume, Chiba (JP)

(73) Assignee: SONY CORPORATION, Tokyo (JP)

( * ) Notice: Subject to any disclaimer, the term of this patent is extended or adjusted under 35 U.S.C. 154(b) by 663 days.

(21) Appl. No.: 14/118,980

(22) PCT Filed: Apr. 12, 2012

(86) PCT No.: PCT/JP2012/060527
§ 371 (c)(1),
(2), (4) Date: Nov. 20, 2013

(87) PCT Pub. No.: WO2012/165079
PCT Pub. Date: Dec. 6, 2012

(65) Prior Publication Data
US 2014/0091629 A1  Apr. 3, 2014

(30) Foreign Application Priority Data
May 30, 2011 (JP) .................... 2011-120292

(51) Int. Cl.
*H02J 9/06* (2006.01)
*H02J 3/46* (2006.01)
*H02J 7/35* (2006.01)

(52) U.S. Cl.
CPC .............. *H02J 9/062* (2013.01); *H02J 3/46* (2013.01); *H02J 7/35* (2013.01); *Y02B 10/72* (2013.01); *Y10T 307/625* (2015.04)

(58) Field of Classification Search
CPC ..... H02J 9/062; H02J 7/35; H02J 3/46; Y02B 10/72; Y10T 307/625
(Continued)

(56) References Cited

U.S. PATENT DOCUMENTS 5,892,758 A * 4/1999 Argyroudis ............ G08C 17/02
340/870.02
8,457,802 B1 * 6/2013 Steven .................... G06Q 10/00
700/291

(Continued)

FOREIGN PATENT DOCUMENTS

JP 2001-258176 9/2001
JP 2002-369380 12/2002

*Primary Examiner* — Jared Fureman
*Assistant Examiner* — Emmanuel R Dominique
(74) *Attorney, Agent, or Firm* — Chip Law Group (57) ABSTRACT

A converter which converts first AC power input from an external power system to DC power, a storage device charged with the DC power from the converter, an inverter which converts DC power from the storage device to second AC power, an output AC power generating unit to which the first AC power and the second AC power are input, the unit which generates output AC power, and a controller which obtains external power information indicating a relationship between a power supply and a power demand in the external power system through a network and outputs a control signal to control the output AC power generating unit according to the external power information are provided. The controller controls the output AC power generating unit according to a state of a margin of the power supply.

10 Claims, 3 Drawing Sheets

(58) Field of Classification Search
USPC .......................................................... 307/104
See application file for complete search history.

(56) References Cited

U.S. PATENT DOCUMENTS

| | | | | |
|---|---|---|---|---|
| 8,548,638 | B2* | 10/2013 | Roscoe .................. | H02J 3/008 700/295 |
| 8,571,720 | B2* | 10/2013 | Yonezawa ................ | H02J 3/14 700/291 |
| 2007/0005192 | A1* | 1/2007 | Schoettle ................ | H02J 9/062 700/286 |
| 2010/0017045 | A1 | 1/2010 | Nesler et al. | |
| 2010/0211233 | A1* | 8/2010 | Roscoe .................. | H02J 3/008 700/296 |
| 2010/0217450 | A1* | 8/2010 | Beal ........................ | H02J 3/14 700/291 |
| 2011/0204720 | A1* | 8/2011 | Ruiz .................. | B60L 11/1816 307/66 |
| 2011/0210702 | A1* | 9/2011 | Shimayama .............. | H02J 3/32 320/134 |
| 2011/0304295 | A1* | 12/2011 | McNally ............... | H01M 10/46 320/101 |
| 2012/0200260 | A1* | 8/2012 | Karner ................. | H01M 10/44 320/109 |

\* cited by examiner

POWER SUPPLY DEVICE AND METHOD OF CONTROLLING POWER SUPPLY

TECHNICAL FIELD

This disclosure relates to a power supply device and a method of controlling a power supply enabling control of a consumed amount of external power in a home, for example, according to a relationship between a power supply and a power demand of an external power system.

BACKGROUND ART

When a power supply of an external power system (referred to as a grid) decreases by an accident and the like or when a power demand seasonally increases, the power demand becomes larger relative to the power supply and an unexpected power interruption might occur. In addition, a temporary power interruption due to a torrential rain, lightning and the like is supposed, so that it is known that an uninterruptible power supply (UPS) to supply power to a computer and a peripheral device when power failure such as the power interruption occurs is used. However, a conventional uninterruptible power supply is effective only against a brief power interruption and this merely serves to temporarily supply the power to the computer and the peripheral device. Therefore, this is insufficient for supplying the power in a home when a large-scale and long-time power interruption occurs. Further, there is a problem that the uninterruptible power supply operates at the time of the power interruption and this cannot be used for decreasing power usage of the grid.

Recently, a larger-capacity home storage device is put into practical use. It is possible to secure the power supply at the time of the power interruption to decrease the power demand and the power usage of the external power system by using the home storage device. For example, it is considered to decrease the supply of AC power from the external power system to make up for power shortage by the storage device.

In a next-generation power grid (hereinafter, referred to as a smart grid), which solves a problem in power transmission between a supplier and a demander using information technology, control for cutting back power consumption of a demander side (DR (demand response)) may be performed by a supplier side. For example, during peak power demand periods, load control in which a power provider changes a preset temperature of a home air conditioner is performed. Measures including such DR taken by the supplier side to the demander side are referred to as DSM (demand side management).

Patent Document 1 discloses that power consumption of a plurality of equipment instruments connected to a home network is controlled by an overall control device, and each of a plurality of equipment instruments is provided with a secondary battery to be operated by power of the secondary battery during peak power periods and operated by power from a commercial power supply and charge the secondary battery during off-peak periods. The overall control device receives a power control instruction from the power supplier side.

CITATION LIST

Patent Document

Patent Document 1: Japanese Patent Application Laid-Open No. 2001-258176

SUMMARY OF THE INVENTION

Problems to be Solved by the Invention

In Patent Document 1, it is necessary that a home electronic device be controlled by a control device provided in every home and the control device be connected to a DSM control center of a power company. Therefore, both of a network for connecting the control device to the DSM control center and a network for controlling the home electronic device by the control device is required. As a result, significant change in configuration of a conventional power grid is required. Such a problem arises also when a smart meter is used.

Therefore, an object of this disclosure is to provide a power supply device and a method of controlling a power supply capable of controlling power usage with small change of an existing power supply system without control by a power supplier.

Solution to Problems

In order to solve the above-described problem, this disclosure is a power supply device, including:

a converter which converts first AC power input from an external power system to DC power;

a storage device charged with the DC power from the converter;

an inverter which converts DC power from the storage device to second AC power;

an output AC power generating unit to which the first AC power and the second AC power are input, the unit which generates output AC power; and a controller which obtains external power information indicating a relationship between a power supply and a power demand in the external power system through a network and outputs a control signal to control the output AC power generating unit according to the external power information, wherein the controller controls the output AC power generating unit such that the first AC power accounts for most of the output AC power when there is a margin of the power supply, and the controller controls the output AC power generating unit such that the first AC power and the second AC power are added up to obtain the output AC power when there is no margin of the power supply.

This disclosure is a method of controlling a power supply, including:

converting first AC power input from an external power system to DC power by a converter;

charging a storage device with the DC power from the converter;

converting DC power from the storage device to second AC power by an inverter;

generating output AC power by an output AC power generating unit from the first AC power and the second AC power; and obtaining external power information indicating a relationship between a power supply and a power demand in the external power system through a network and generating a control signal to control the output AC power generating unit according to the external power information by a controller, wherein the controller controls the output AC power generating unit such that the first AC power accounts for most of the output AC power when there is a margin of the power supply, and the controller controls the output AC power generating unit such that the first AC power and the second AC power are added up to obtain the output AC power when there is no margin of the power supply.

Effects of the Invention

According to this disclosure, it is possible to autonomously control usage of external power by a demander such as a home.

MODE FOR CARRYING OUT THE INVENTION

An embodiment of this disclosure is hereinafter described. Meanwhile, although the embodiment hereinafter described is a preferred specific example of this disclosure with technically preferred various limitations, the scope of this disclosure is not limited to the embodiment unless it is especially described to limit this disclosure in a following description.

[One Embodiment of Power Supply Device]

Figure 1:
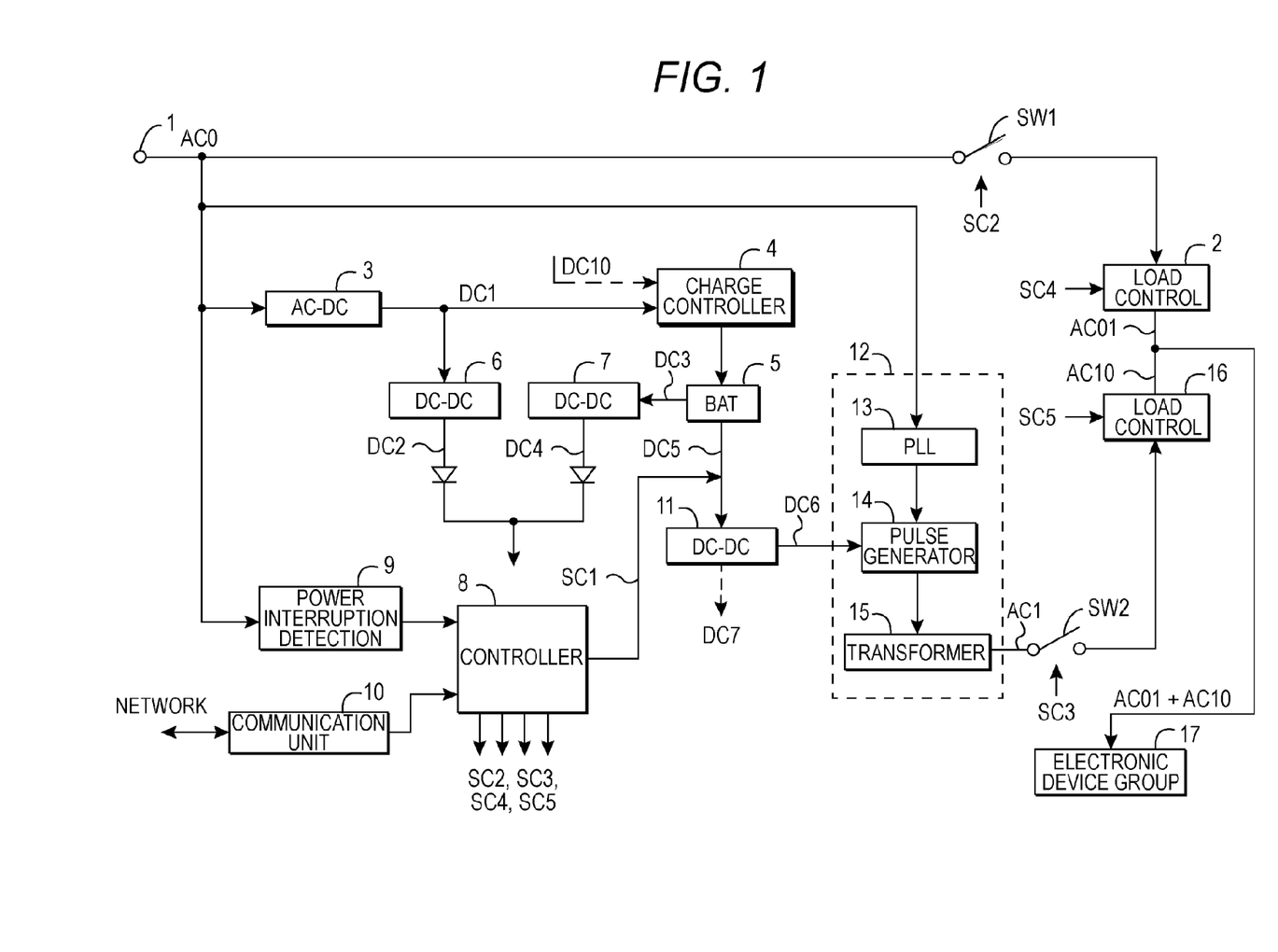
FIG. 1 is a block diagram of one embodiment of a power supply device according to this disclosure.

A power supply device (power system) according to this disclosure is described with reference to FIG. 1. Power generated at a power plant of a power supplier is supplied to a home electricity meter through a power transmission grid and a power distribution grid not illustrated and AC power is supplied from the electricity meter to an external AC power input terminal 1 in FIG. 1. Input external AC power (hereinafter, appropriately referred to as grid power) is represented as AC0. Meanwhile, although it is described about power control in a home, this disclosure may be applied not only to the home but also to a sectioned area in terms of a power supply such as a building and a factory.

The grid power AC0 is supplied to a load controller 2 through a switch SW1. First AC power output from the load controller 2 is represented as AC01. As described later, second AC power AC10 generated from DC power of a storage device 5 is output from a load controller 16. The AC power AC01 and the AC power AC10 are added up to be supplied to a home electronic device group 17. Although not illustrated, the AC power is supplied to a switchboard (including a distribution switchboard) and the power is supplied to each electronic device of the electronic device group 17 through a power line derived from the switchboard and an outlet. An example of the electronic device group 17 includes an air conditioner, a refrigerator, a light fixture, a washing machine, a television receiver and the like.

The grid power AC0 is supplied to an AC-DC converter 3 to generate DC power DC1. The DC power DC1 is supplied to a charge controller 4 and a DC-DC converter 6. The charge controller 4 is configured to control charge of the storage device 5. An example of the storage device 5 includes a secondary battery such as a lithium-ion battery, an electric double layer and the like. For example, it is possible to use a storage device obtained by composing a battery block in which 8 cylindrical lithium-ion secondary cells are connected in parallel and connecting 16 battery blocks in series to store in a common case.

Although a charging power supply to the storage device 5 is principally the DC power DC1, another DC power DC10 may also be used. Another DC power is an output of clean energy generation such as photovoltaic power generation, a fuel cell, and wind power generation. Further, the storage device 5, for example, the secondary battery may be portable. That is to say, the secondary battery for vehicle such as an electric bicycle and an electric automobile may be used as the storage device 5.

DC power DC2 is generated by the DC-DC converter 6. Further, output DC power DC3 of the storage device 5 is supplied to a DC-DC converter 7 to form DC power DC4. Each of the DC power DC2 and the DC power DC4 is extracted as an operation power supply (several volts) through a diode. The DC-DC converters 6 and 7 generate stable output DC power of a desired value from input DC power. The DC power (DC2 or DC4) extracted from a connecting point of the diodes is used as the operation power supply of a controller 8 and the like to be described later. Herein, a relationship of DC2>DC4 is established, and in general, the DC power DC2 generated from the grid power is used in preference to the DC power DC4 for preventing the storage device 5 from becoming exhausted.

The grid power AC0 is supplied to a power interruption detecting unit 9. The power interruption detecting unit 9 detects power failure such as a power interruption of an external AC power system and a significant voltage drop and a detection signal output from the power interruption detecting unit 9 is supplied to the controller 8. The controller 8 is configured to control an entire power supply device illustrated in FIG. 1. The controller 8 is composed of a CPU (central processing unit), a flash ROM, a DRAM (dynamic random access memory) and the like connected to one another through an internal bus.

Further, a communication unit 10 is provided. The communication unit 10 obtains external power information indicating a relationship between a power supply and a power demand in the external power system (hereinafter, appropriately referred to as grid information) from a server, a cloud, a website and the like through a network. This accesses a power management center provided by a supplier of the external AC power, for example, on the network through the Internet to obtain the grid information. Further, this may obtain the grid information from a site operated by those other than the supplier. It is possible to access the network by wired communication, wireless communication and the like. Further, it is also possible that the controller 8 obtains the grid information obtained by another home computer through a home LAN (local area network). Further, it is also possible to obtain the grid information obtained by one of the electronic device group 17 through not only the above-described home LAN but also a power line communication channel.

Meanwhile, although a configuration in which the controller 8, the power interruption detecting unit 9, and the communication unit 10 are separated is described in this example, it is also possible to realize them as one microcomputer and the like to integrate. In this case, it is possible to collectively supply the operation power to the microcomputer. Also, the power interruption is detected by rectifying the grid power AC0, lowering potential thereof to a predetermined value by voltage dividing, inputting the same to an A/D converter of the microcomputer, and reading the same by software to determine.

DC power DC5 output from the storage device 5 is supplied to a DC-DC converter 11. The DC-DC converter 11 outputs DC power DC6 and DC power DC7. The DC power DC6 is supplied to a pulse generator 14 of an inverter 12. The DC power DC7 is a DC output which may be used in the home. Although the DC output DC7 may be made a USB (universal serial bus) power output, for example, this is already proposed as the output of a predetermined voltage (24V, 48V, 60V, 240V, 360V and the like) with an outlet plug and the like also different from an existing AC outlet.

The inverter 12 is formed of a PLL (phase locked loop) 13, the pulse generator 14, and a transformer 15, for example, to generate AC power AC1 from the DC power DC6. The grid power AC0 is supplied to the PLL 13 and a pulse signal in phase with the grid power AC0 is generated by the PLL 13. The PLL 13 may output the pulse signal with a frequency similar to that when there is the grid power AC0 also when the grid power AC0 is not supplied due to the power interruption and the like.

The inverter 12 also referred to as a grid tie inverter generates the AC power AC1 synchronous with (in phase with) the grid power. The AC power AC1 is supplied to the load controller 16 through a switch SW2. The second AC power AC10 is generated by the load controller 16. Each of the load controllers 2 and 16 is composed of variable resistance having relatively small electric resistance, for example. They may adjust output power by controlling the variable resistance. That is to say, they select the power to be output to a subsequent electronic device. That is to say, when the variable resistance of the load controller 2 on a grid side is smaller than the variable resistance of the load controller 16 on an inverter side, the AC power AC01 on the grid side has priority, and in an opposite case, the AC power AC10 on the inverter side has priority. Meanwhile, not only the configuration to use the variable resistance but also the configuration capable of controlling magnitude of each of the two types of AC power may be used as the load controllers 2 and 16.

The controlled AC power AC01 may be represented as $\alpha AC0$ ($\alpha$ is a value between 0 and 1), the controlled AC power AC10 may be represented as $\beta AC1$ ($\beta$ is a value between 0 and 1), and total power supplied to the electronic device group 17 may be represented as (AC01+AC10=$\alpha AC0+\beta AC1$). $\alpha$ and $\beta$ are controlled by control signals SC4 and SC5 from the controller 8 such that these coefficients (weights) change in a complementary manner. For example, in a case of ($\alpha=1$, $\beta=0$), the total AC power includes AC0 only, and in a case of ($\alpha=0$, $\beta=1$), the total AC power includes AC1 only. Change in $\alpha$ and $\beta$ may be continuous change or stepwise change. Meanwhile, when the load controllers 2 and 16, which use the variable resistance, are used, it is difficult to completely set ($\alpha$, $\beta=0$). However, it is possible to set the coefficients to 0 by using the switch together, for example.

The coefficients $\alpha$ and $\beta$ are controlled by the controller 8 in association with the grid information indicating the relationship between the power supply and the power demand obtained through the communication unit 10. The grid information is difference between the power supply and the power demand, a ratio (%) of the power demand to the power supply, information (%) of restrictions on the power demand and the like. Herein, the power supply and the power demand are not limited to current values and may be predicted values. Further, the power supply and the power demand are values within an area, which is under the authority of a certain power company, for example. However, when information in a different area (for example, administrative district unit) is provided as the power supply and the power demand, such information may also be used. Further, the power supply is not limited only to a supply of the power company and generated power of a natural energy generating device (for example, a photovoltaic cell) connected under the umbrella of the power company may be added. In this case, a power generation amount of natural energy changes depending on an environmental situation (such as an amount of sunlight in a case of the photovoltaic cell and a wind speed in a case of the wind power generation), so that it is possible to correct by adding information indicating the environmental situation to the above-described grid information, calculating the power supply by the natural energy in the controller 8, and adding the same to the supply of the power company. It goes without saying that the added value itself may be made the grid information as the supply. Meanwhile, although the power company in this description is described to have both of a function as a power generation company to generate the power and a function as a power transmission/distribution company to distribute the power, the functions may be separated. In this case, the supply of the power company is replaced by the supply of the power generation company, and the natural energy generating device under the umbrella of the power company is replaced by the natural energy generating device under the umbrella of the power transmission/distribution company.

For example, a ratio X of the power demand to the power supply (power demand/power supply (%)) is obtained as the grid information, and a specific example of the control of the coefficients $\alpha$ and $\beta$ based on the grid information is described. Meanwhile, numerical values to be described below are merely an example and other desired numerical values may also be set.

X≤first threshold (80%) (that is to say, when there is a sufficient margin of the power supply):
($\alpha=1$, $\beta=0$)
Therefore, supplied AC power becomes (AC0).
(80%<X≤90%) (that is to say, when there is the margin of the power supply)
($\alpha=0.9$, $\beta=0.1$)
Therefore, the supplied AC power becomes (0.9AC0+0.1AC1).
(90%<X≤95%) (that is to say, when there is no margin of the power supply):
($\alpha=0.6$, $\beta=0.4$)
Therefore, the supplied AC power becomes (0.6AC0+0.4AC1).
X>second threshold (95%) (that is to say, there is no margin at all of the power supply):
($\alpha=0$, $\beta=1$)
Therefore, the supplied AC power becomes (AC1).

Further, when the power failure such as the power interruption is detected, the switch SW1 is turned off and the switch SW2 is turned on to set ($\alpha=0$, $\beta=1$). Meanwhile, the above-described numerical values of $\alpha$ and $\beta$ are merely an example and other values may also be set.

The above-described set values of $\alpha$ and $\beta$ are included in a control program of the controller 8 and the control signals SC4 and SC5 for setting the values of the coefficients $\alpha$ and $\beta$ according to the grid information, for example, the ratio X are generated. Meanwhile, it is also possible to provide a display unit in association with the controller 8 for graphically displaying the above-described values of the coefficients $\alpha$ and $\beta$ or a ratio between the AC power AC01 and the AC power AC10 to a user.

A control signal SC1 output by the controller 8 controls whether to output the DC power DC5 from the storage device 5. A control signal SC2 output by the controller 8 controls on/off of the switch SW1. A control signal SC3 output by the controller 8 controls on/off of the switch SW2.

[Power Supply Controlling Process]

Figure 2:
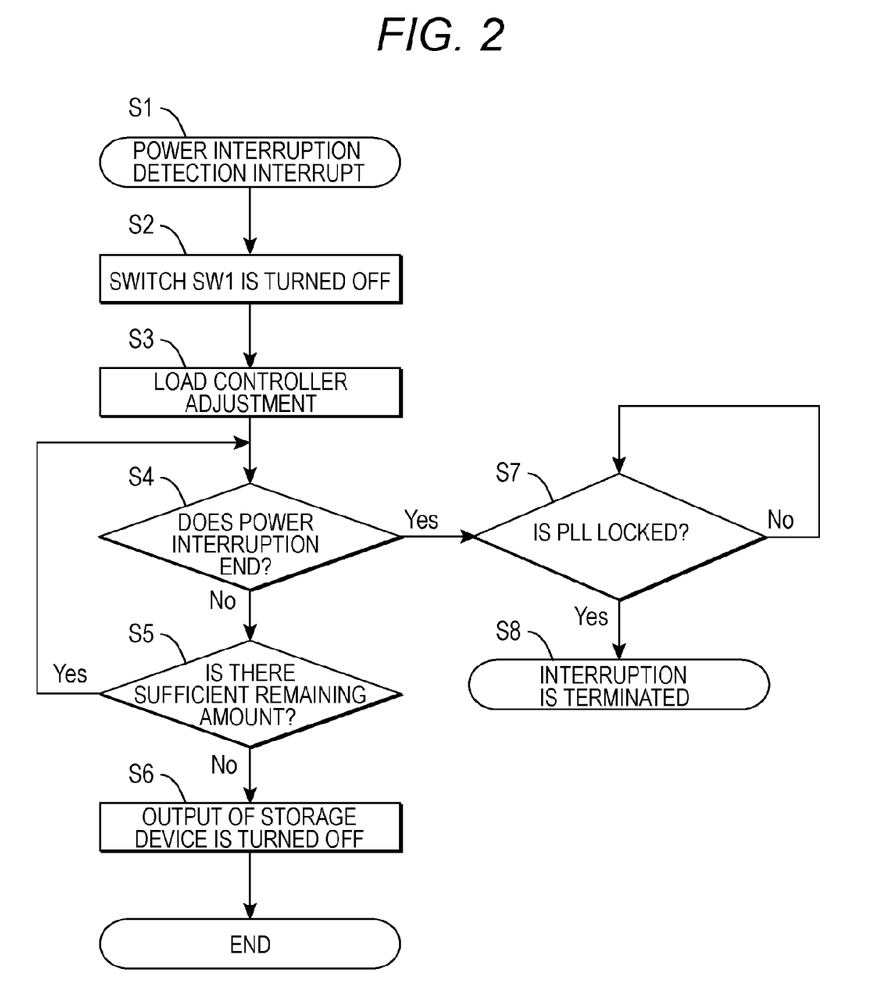
FIG. 2 is a flowchart used for describing operation of one embodiment of this disclosure.
Figure 3:
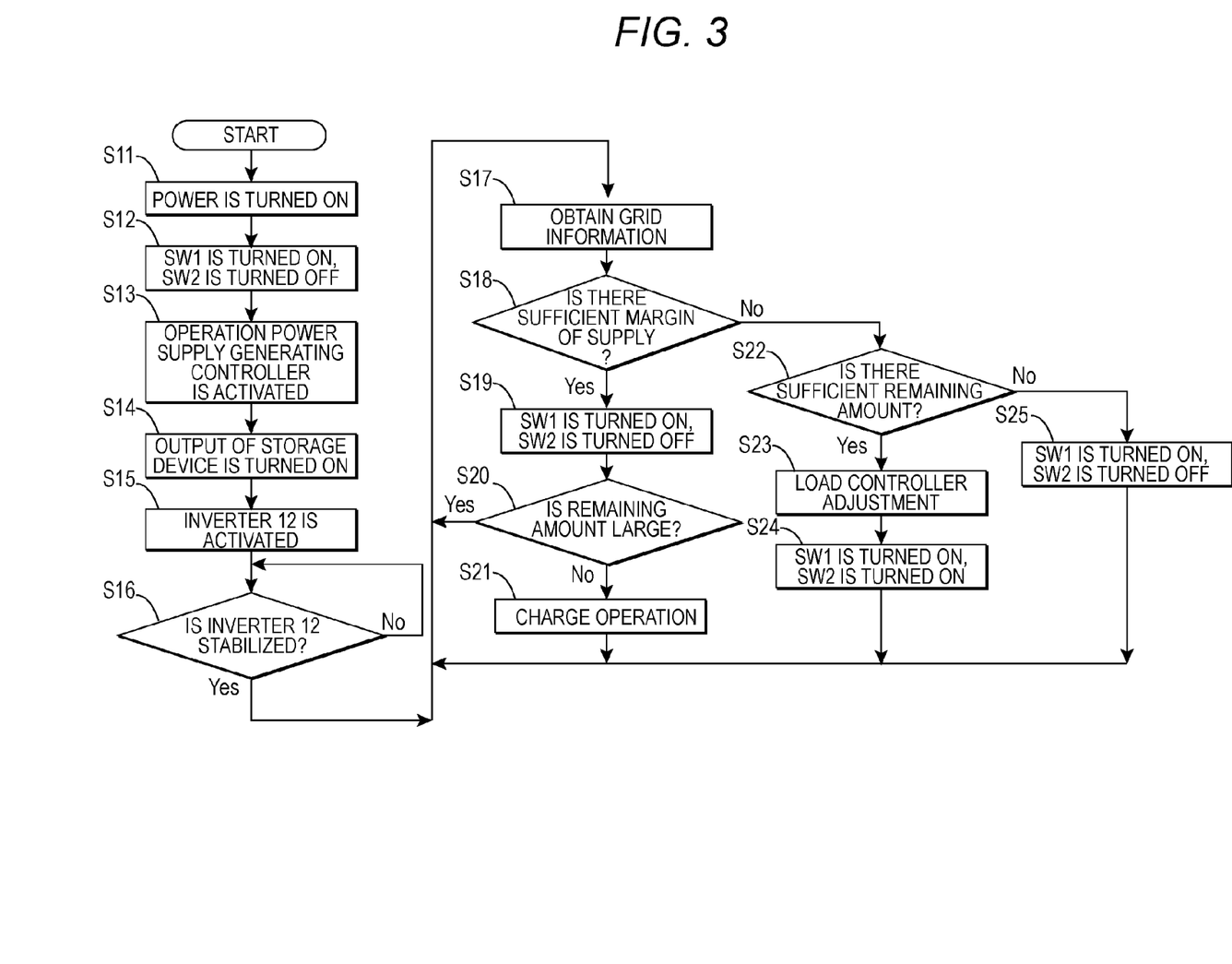
FIG. 3 is a flowchart used for describing operation of one embodiment of this disclosure.

Hereinafter, a power supply controlling process by control of the controller 8 is described with reference to flowcharts in FIGS. 2 and 3. The flowchart in FIG. 2 illustrates a flow of interrupt processing when the power interruption as the power failure occurs and the flowchart in FIG. 3 illustrates a power supplying process at times other than the power interruption. Since the process at the time of the power interruption is preferentially performed, it is shifted to the power interruption process from any event in the flowchart in FIG. 3. The power interruption ends and an output of the inverter 12 is stabilized, and then the interrupt processing is terminated.

[Process when Power Interruption is Detected]

When the power interruption is detected by the power interruption detecting unit 9, a power interruption detection interrupt processing is started (step S1). In step S2, the switch SW1 is turned off by the control signal SC2 and the input of the grid power is shut out. This is for preventing a reverse power flow of the AC power AC10.

In step S3, a resistance value of the variable resistance of the load controller 16 is minimized. It is also possible to maximize the resistance value of the variable resistance of the load controller 2 as needed. In a case of the power interruption, home power consumption is covered by the AC power generated by the DC power from the storage device 5.

In step S4, it is determined whether the power interruption ends. When it is determined that the power interruption continues, it is determined whether a remaining amount of the storage device 5 is large in step S5. When it is determined that the remaining amount is large, the procedure returns to step S4 (to detect whether power interruption ends). Meanwhile, it is herein represented whether the remaining amount is large, this may also be determined depending on whether a discharging voltage of a battery is higher than a predetermined voltage.

When it is determined that the remaining amount of the storage device 5 is small in step S5, the output of the storage device 5 is turned off in step S6, and the procedure is terminated. Meanwhile, when it is determined that the remaining amount of the storage device 5 is small, it is also possible to notify the user of this in step S6.

When it is determined that the power interruption ends in step S4, the procedure shifts to step S7. In step S7, it is determined whether the PLL 13 of the inverter 12 is phase-locked to the grid power. In addition to detecting the lock of the PLL 13, it is also possible to determine whether the inverter 12 is stabilized. Further, when a routine to determine stabilization of the inverter 12 is included in the flowchart in FIG. 3, it is also possible to determine there. When it is determined that the PLL 13 is locked in step S7, the interrupt processing is terminated.

[Power Supply Controlling Process]

The power supply controlling process is described with reference to the flowchart in FIG. 3. In the procedure in FIG. 3, it is supposed that there is the margin of the grid power at a starting point indicated by START. The power is turned on by turning-on of a power switch and the like (step S11). In step S12, the switch SW1 is turned on and the switch SW2 is turned off.

The DC power DC1 is generated from the grid power AC0 by the AC-DC converter 3 and the DC power DC2 is generated by the DC-DC converter 6. The DC power DC2 is supplied to the controller 8 as the operation power supply and the controller 8 is activated (step S13).

Further, in step S14, the output of the DC power DC5 from the storage device 5 is turned on by the control signal SC1. The DC power is supplied to the DC-DC converter 11 and the DC power DC6 generated by the DC-DC converter 11 is supplied to the inverter 12, and then the inverter 12 is driven (step S15).

It takes some time until the inverter 12 may output the AC power AC1 synchronous with the grid power AC0. Therefore, it is determined whether the inverter 12 is stabilized in step S16. As described above, it is also possible to detect the lock of the PLL 13 of the inverter 12.

When it is determined that the inverter 12 is stabilized in step S16, the grid information is obtained through the communication unit 10 in step S17. The grid information is obtained periodically (for example, every one minute). Then, it is determined whether there is the sufficient margin of the supply based on the grid information in step S18. A case in which there is the sufficient margin is the case in which the grid information is (X=power demand/power supply (%)) and X≤first threshold (80%) as described above, for example.

When a determination result in step S18 is Yes (there is the sufficient margin of the supply), the switch SW1 is turned on and the switch SW2 is turned off in step S19. The process in step S19 is necessary because the switch SW1 is turned off when the above-described interrupt processing is terminated and the procedure returns.

It is determined whether the remaining amount of the storage device 5 is large in step S20. When the remaining amount is small, charge operation is performed in step S21. When the remaining amount is large, the charge is not performed and the procedure returns to step S17 (to obtain the grid information). Meanwhile, it is herein represented whether the remaining amount is large, this may also be determined depending on whether a charging voltage of the battery is higher than a predetermined voltage, whether a charging current is smaller than a predetermined amount and the like.

When the determination result in step S18 is No (there is not the sufficient margin of the supply), the procedure shifts to step S22 and it is determined whether the remaining amount of the storage device 5 is large in step S22. When the remaining amount is determined to be large in step S22, the procedure shifts to step S23 (to adjust the load controller) and it is adjusted such that (AC01+AC10=αAC0+βAC1) is output as the AC power. The coefficients α and β in this case are set according to a degree of the margin. As an example, as described above, the value of the variable resistance of the load controller 2 and that of the load controller 16 are controlled according to a state of the margin of the power supply and the coefficients α and β are varied. For example, in the case of (80%<X≤90%), it is set (α=0.9, β=0.1), in the case of (90%<X≤95%), it is set (α=0.6, β=0.4), and in the case of (X>second threshold (95%)), it is set (α=0, β=1). It is also possible to adjust these parameters according to a storage amount of the storage device 5 (for example, when the power is small, large discharge is not performed even in a critical condition).

In step S24, the switch SW1 is turned on and the switch SW2 is turned on, then the AC power corresponding to the above-described set values is output. As in step S19, the process in step S23 is necessary because the switch SW1 is turned off when the above-described interrupt processing is terminated and the procedure returns. Then, the procedure returns to step S17 (to obtain the grid information).

When it is determined that the remaining amount of the storage device 5 is small in step S22, the switch SW1 is turned on and the switch SW2 is turned off in step S25. Then, the procedure returns to step S17 (to obtain the grid information). Meanwhile, when it is determined that the remaining amount of the storage device 5 is small in step S22, it is also possible to notify the user of this.

Meanwhile, this disclosure may also have a following configuration.

(1)

A power supply device, including:

a converter which converts first AC power input from an external power system to DC power;

a storage device charged with the DC power from the converter;

an inverter which converts DC power from the storage device to second AC power;

an output AC power generating unit to which the first AC power and the second AC power are input, the unit which generates output AC power; and a controller which obtains external power information indicating a relationship between a power supply and a power demand in the external power system through a network and outputs a control signal to control the output AC power generating unit according to the external power information, wherein the controller controls the output AC power generating unit such that the first AC power accounts for most of the output AC power when there is a margin of the power supply relative to the power demand, and the controller controls the output AC power generating unit such that the first AC power and the second AC power are added up to obtain the output AC power when there is no margin of the power supply relative to the power demand.

(2)

The power supply device according to (1), wherein the controller controls the output AC power generating unit such that the second AC power accounts for most of the output AC power when power failure occurs.

(3)

The power supply device according to (1) or (2), wherein the external power information is information of difference between current or predicted power supply and current or predicted power demand or restriction information of the power demand.

(4)

The power supply device according to any one of (1), (2), and (3), wherein the external power information is obtained by also taking prediction of natural energy into consideration.

(5)

The power supply device according to any one of (1), (2), (3), and (4), wherein the inverter outputs the second AC power synchronous with the first AC power.

(6)

The power supply device according to any one of (1), (2), (3), (4), and (5), wherein the storage device is charged with DC power generated from natural energy.

(7)

A method of controlling a power supply, including:

converting first AC power input from an external power system to DC power by a converter;

charging a storage device with the DC power from the converter;

converting DC power from the storage device to second AC power by an inverter;

generating output AC power by an output AC power generating unit from the first AC power and the second AC power; and obtaining external power information indicating a relationship between a power supply and a power demand in the external power system through a network and generating a control signal to control the output AC power generating unit according to the external power information by a controller, wherein the controller controls the output AC power generating unit such that the first AC power accounts for most of the output AC power when there is a margin of the power supply relative to the power demand, and the controller controls the output AC power generating unit such that the first AC power and the second AC power are added up to obtain the output AC power when there is no margin of the power supply relative to the power demand.

[Variation]

Although one embodiment of this disclosure is specifically described above, this disclosure is not limited to the above-described one embodiment and various modifications based on the technical idea of this disclosure may be made.

REFERENCE SIGNS LIST

1 . . . external AC power (grid power) input terminal
2 . . . load controller
3 . . . AC-DC converter
4 . . . charge controller
5 . . . storage device
8 . . . controller
9 . . . power interruption detecting unit
12 . . . inverter
16 . . . load controller

The invention claimed is:

1. A power supply device, comprising:

a converter configured to convert a first AC power input from an external power system to a first DC power;

a storage device configured to be charged with the first DC power from the converter;

an inverter configured to convert a second DC power from the storage device to a second AC power, wherein the second AC power is in phase with the first AC power;

an output AC power generating unit configured to generate an output AC power based on the first AC power and the second AC power that is in phase with the first AC power; and a controller configured to:

obtain external power information which indicates a relationship between a power supply and a power demand in the external power system through a network, wherein the relationship corresponds to a ratio of the power demand to the power supply;

output a control signal to control the output AC power generating unit based on the obtained external power information;

control the output AC power generating unit such that the first AC power accounts for all of the output AC power based on the ratio that is less than or equal to a first threshold value; and control the output AC power generating unit such that the first AC power and the second AC power are added to obtain the output AC power based on the ratio that is greater than the first threshold value and less than a second threshold value.

2. The power supply device according to claim 1, wherein based on a power failure in the external power system, the controller is further configured to control the output AC power generating unit such that the second AC power accounts for all of the output AC power.

3. The power supply device according to claim 1, wherein the external power information comprises information of a difference between current or predicted power supply, and current or predicted power demand or restriction information of the power demand.

4. The power supply device according to claim 1, wherein the external power information is obtained based on a prediction of available natural energy.

5. The power supply device according to claim 1, wherein the storage device is further configured to be charged with a third DC power generated from natural energy.

6. The power supply device according to claim 1, wherein the power demand and the power supply are determined for a geographical area.

7. The power supply device according to claim 1, wherein the first threshold value is 0.8 times of the power supply of the external power system.

8. The power supply device according to claim 1, wherein the second threshold value is 0.95 times of the power supply of the external power system.

9. The power supply device according to claim 1, wherein the inverter includes a phase locked loop (PLL) configured to convert the second DC power to the second AC power that is in phase with the first AC power.

10. A method of controlling a power supply, comprising:
converting a first AC power input from an external power system to a first DC power by a converter;
charging a storage device with the first DC power from the converter;
converting a second DC power from the storage device to a second AC power by an inverter, wherein the second AC power is in phase with the first AC power;
generating an output AC power by an output AC power generating unit based on the first AC power and the second AC power that is in phase with the first AC power;
obtaining external power information indicating a relationship between a power supply and a power demand in the external power system through a network, wherein the relationship corresponds to a ratio of power demand to the power supply;
generating, by a controller configured to receive operation power supply from the first DC power, a control signal to control the output AC power generating unit based on the obtained external power information by a controller;
controlling the output AC power generating unit such that the first AC power accounts for all of the output AC power based on the ratio that is less than or equal to a first threshold value; and
controlling the output AC power generating unit such that the first AC power and the second AC power are added to obtain the output AC power based on the ratio that is greater than the first threshold value and less than a second threshold value.

* * * * *